May 3, 1966  G. L. CONGDON ET AL  3,249,777
MAGNETIC DRIVE OR COUPLING
Filed Dec. 19, 1963  6 Sheets-Sheet 1

INVENTORS
Gerald L. Congdon
Larry L. Peiffer
Leo F. Perry
BY George E. Szekely
AGENT May 3, 1966  G. L. CONGDON ET AL  3,249,777
MAGNETIC DRIVE OR COUPLING
Filed Dec. 19, 1963  6 Sheets-Sheet 2

INVENTORS
George L. Congdon
Larry L. Peiffer
Leo F. Reney
BY
AGENT

May 3, 1966  G. L. CONGDON ET AL  3,249,777
MAGNETIC DRIVE OR COUPLING
Filed Dec. 19, 1963  6 Sheets-Sheet 3
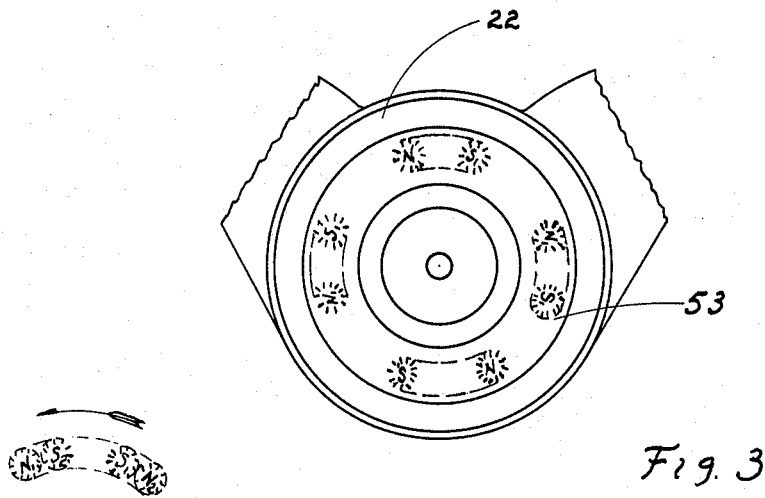
Fig. 3
Fig. 12
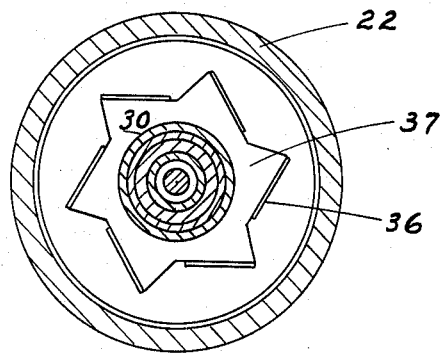
Fig. 4.
INVENTORS
BY
AGENT May 3, 1966     G. L. CONGDON ET AL     3,249,777
MAGNETIC DRIVE OR COUPLING Filed Dec. 19, 1963     6 Sheets-Sheet 4

INVENTORS
George L. Congdon
Larry L. Reiffer
Lee F. Perry
BY
AGENT

May 3, 1966 G. L. CONGDON ET AL 3,249,777
MAGNETIC DRIVE OR COUPLING
Filed Dec. 19, 1963 6 Sheets-Sheet 5

George L. Congdon
Lang L. Pfeiffer INVENTORS
Lee F. Perry
BY George E. Bakely
AGENT May 3, 1966 G. L. CONGDON ET AL 3,249,777
MAGNETIC DRIVE OR COUPLING
Filed Dec. 19, 1963 6 Sheets-Sheet 6

INVENTORS
George L. Congdon
Harry L. Peiffer
Lee F. Perry

BY
AGENT

3,249,777
MAGNETIC DRIVE OR COUPLING

George L. Congdon, Fort Atkinson, Larry L. Peiffer, Whitewater, and Leo F. Perry, Fort Atkinson, Wis., assignors, by mesne assignments, to Bergstrom Manufacturing Company, Rockford, Ill., a corporation of Illinois
Filed Dec. 19, 1963, Ser. No. 331,706
20 Claims. (Cl. 310—104)

This invention pertains to a magnetic drive or coupling of the permanent magnet type. The drive is particularly useful for transmission of torque to rotary fluid propulsion devices such as pumps, fans, blowers, or compressors with cased rotating impellers, but the application of the invention is not limited thereto.

Magnetic drives have been proposed for use in lieu of mechanical couplings for transmitting power to rotary machinery. However, previous embodiments, whether of the electro-magnet or permanent magnet types, have been rather narrowly limited in application, principally by virtue of high cost, bulk and weight. The relatively high cost/torque and weight/torque ratios found in previously known magnetic couplings reflects not only in excessive first cost, but in low drive efficiencies. The consequent excessive power requirement of the drive itself reduces the effectiveness and operating economy of motive systems employing such magnetic drives.

A non-contacting magnetic drive is particularly advantageous in application of fluid propulsion apparatus, such as pumps or blowers, since the wheel or impeller may be housed without a rotary seal for a projecting shaft. Also, there being no mechanical connection between drives and driven member, overloads, such as from an obstruction in the fluid circuit, are relieved by magnetic slip. Thus high safety factors for mechanical parts are unnecessary, the parts being made just strong enough for normal operating loads, provided, however, that the magnetic loads are properly distributed.

No fully satisfactory, economical means has hitherto been devised for eliminating, compensating or absorbing axial magnetic thrust on the impeller. Such thrusts are generally substantially variable with minor variations in positions of parts and operating load variations. In the case of fluid propulsion devices, such as a centrifugal pump, variable flow conditions cause fluctuating internal thrust, in the nature of a hunting action, unless an expensive, closely fitted and balanced construction is employed. The superimposition of an indeterminately variable magnetic thrust may so amplify the hunting action that serious vibrations and flow disturbances result. Consequently previous magnetic coupling designs proved largely impractical for low cost, general service pumps, being necessarily restricted to specialized or "custom" applications. While disposition of the magnetic drive poles in radial relationship theoretically minimizes axial magnetic thrust components, there are several practical design problems, such as size and space limitations and dimensional tolerances, which have not been effectively resolved with prior designs. It is a feature of the magnetic drive according to this invention that the same is readily adaptable to axial or radial pole arrangements, and therefore adaptable to a variety of size, space and duty requirements.

It is a principal object of this invention to provide an inexpensive permanent magnet rotary drive.

It is a further object of this invention to provide a magnetic coupling in which magnetic axial thrust components are magnetically balanced, to eliminate or substantially reduce axial thrust on the driven member.

It is a still further object of this invention to provide a magnetic drive which is readily adaptable to a wide variety of applications.

It is another object of this invention to provide a non-contacting magnetic drive for use with fluid propulsion machines, whereby to dispense with rotary seals in such machines.

It is still another object of this invention to provide a magnetic drive of minimum size and weight relative to transmitted torque, to minimize power consumption by the drive itself.

It is an additional object of this invention to provide a magnetic slip coupling which will protect driven members and prime movers against overload stresses, with consequent saving in size, strength and cost of the mechanical parts involved.

These and other salient objects and advantages of this invention will be apparent from the ensuing description and the accompanying drawings, in which:

FIG. 3 is an end view taken on line 3—3 of FIG. 2, the cover being removed to expose the drive element;

FIG. 4 is a transverse section of line 4—4 of FIG. 2;

Figure 2:
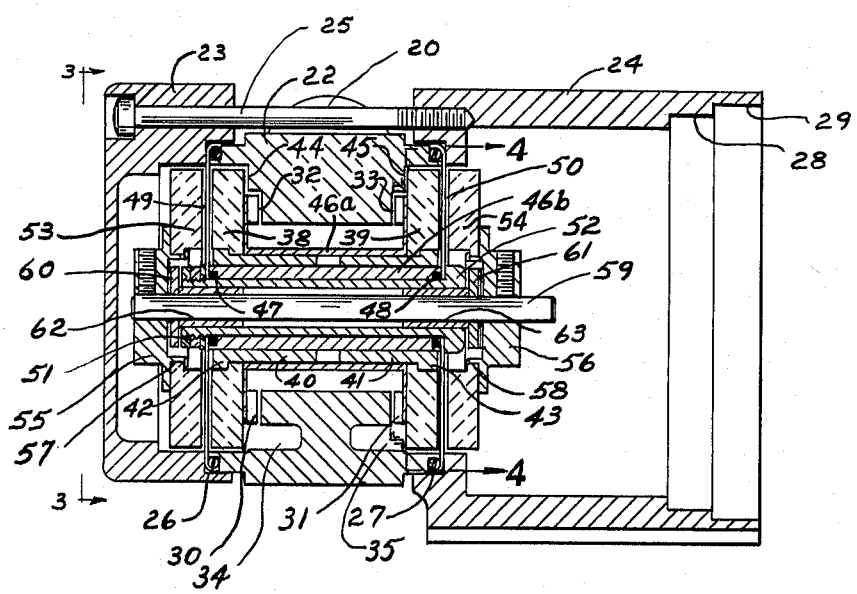
FIG. 2 is a section on line 2—2 of FIG. 1, the motor being omitted from this view.
Figure 14:
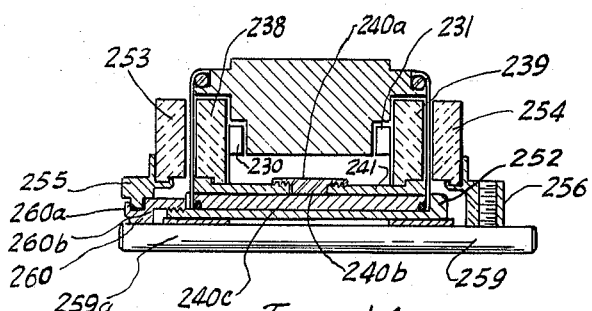
Figure 13:
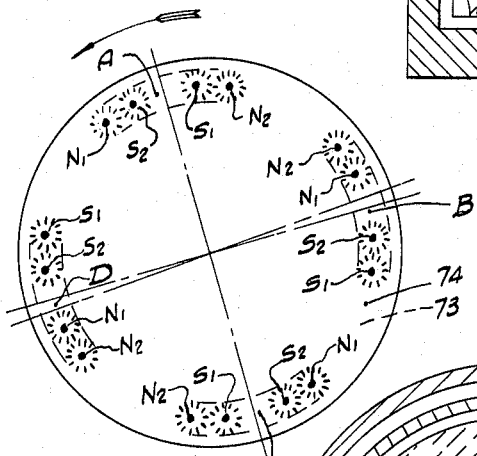
Figure 7:
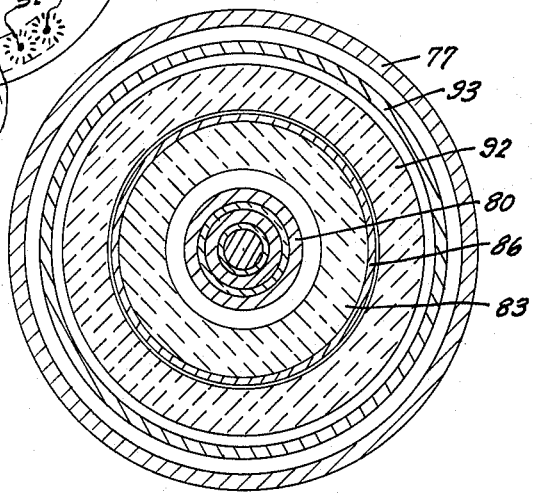
FIG. 7 is an enlarged section on line 7—7 of FIG 6.
Figure 6:
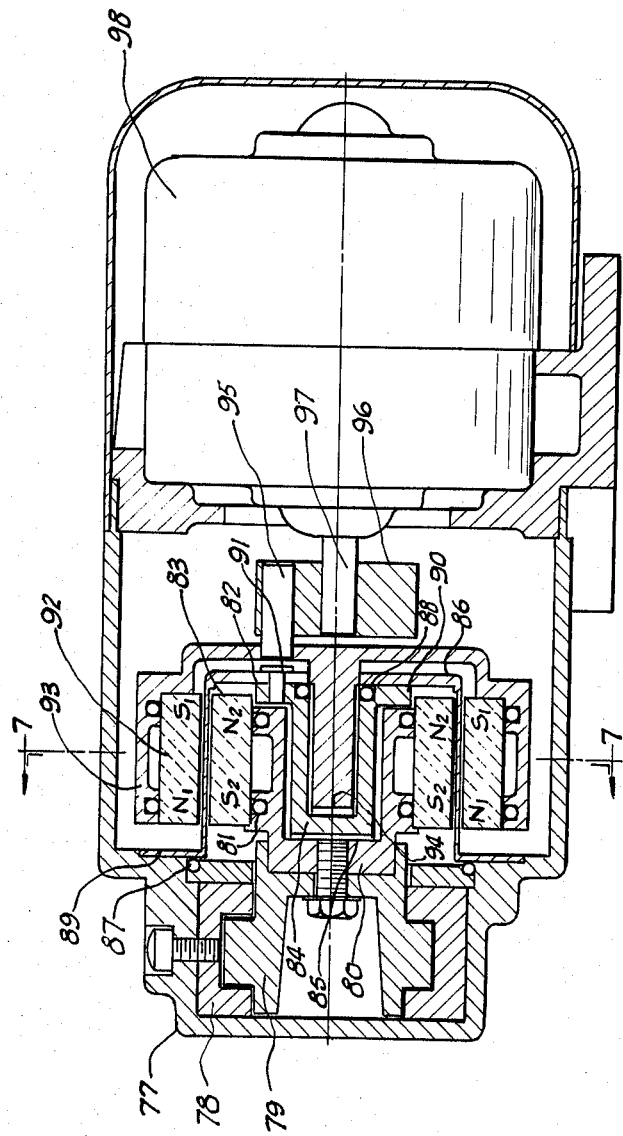
FIG. 6 is a longitudinal section through another type of centrifugal pump, showing a form of radial pole magnetic drive constructed in accordance with this invention.

FIGS. 8–11 inclusive are fragmentary views showing various arrangements and mountings of radial magnetic pole pieces, for use in the form of FIG. 6;

FIGS. 12 and 13 are diagrammatic illustrations of pole positioning employed for the forms of FIGS. 2 and 4 respectively;

FIG. 14 is a partial section similar to the left portion of FIG. 2, showing a modification of one coupling unit.

Figure 1:
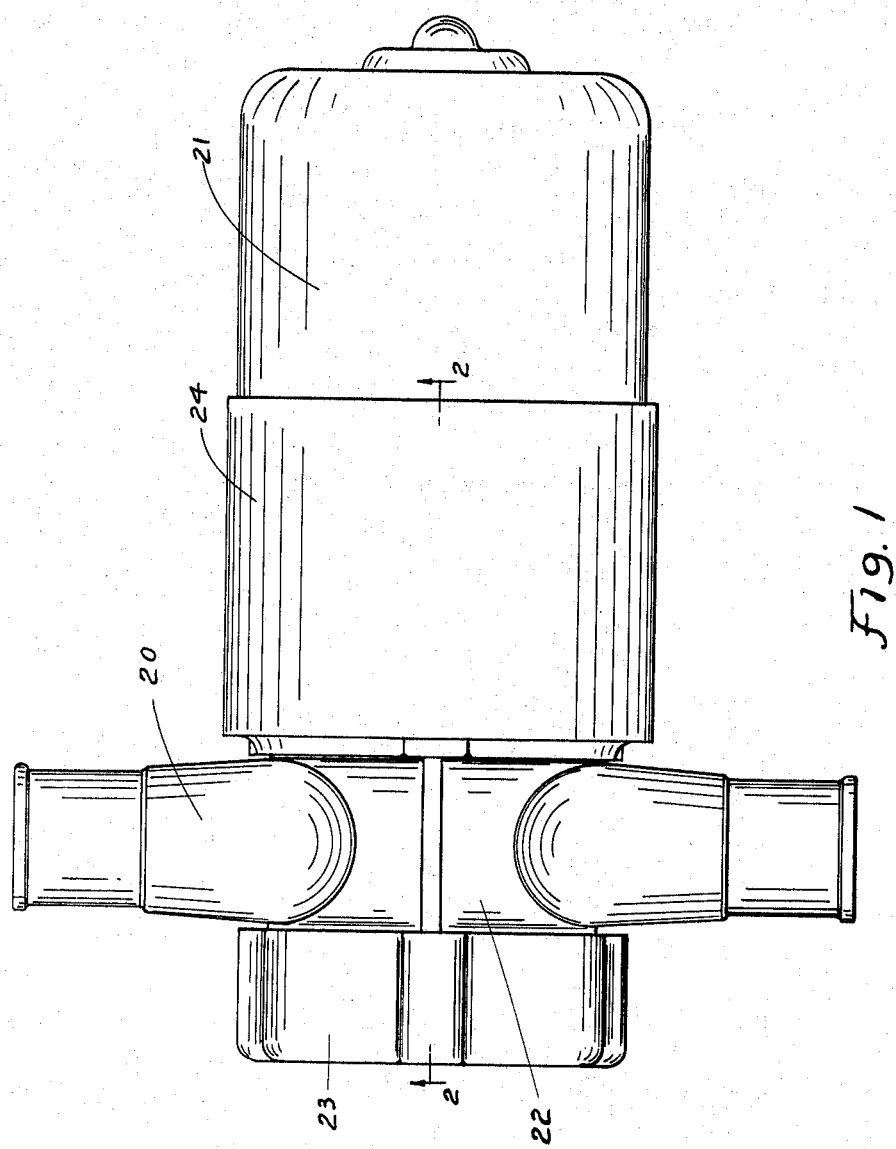
FIG. 1 is a top plan view of a unitary motor-driven turbine pump incorporating a coupling according to this invention.

Referring now to FIG. 1, reference numeral 20 represents a pump and 21 is a motor to be coupled to pump 20 for driving same. The elements of the drive which are external of pump housing 22 are concealed and protected by auxiliary cap 23 and housing 24. While magnetic drives according to this invention may be close coupled, if desired, and as later shown, it is preferable in the form now being described that the motor 21 be mounted somewhat remote from pump 20. For this reason, housing 24 is elongated, to bridge the space between pump 20 and motor 21.

As best seen in FIG. 2, cap 23 and housing 24 may be held to pump housing 22 by through bolts or screws, one of a series of which is indicated at 25. Seals 26, 27, 47 and 48 make the assembly fluid tight. The end of housing 24 remote from pump 20 may be provided with motor alignment means, such as counterbores 28, 29, or such other provision as will fit the flange, end bell or other mounting provision on the selected motor (not shown), which may be of any desired type and rating, as best suited to the particular duty.

The drive form of FIG. 2 is primarily intended for use with the dual-impeller pump arrangement shown. Impellers 30, 31 revolve in chambers 32, 33 at opposite faces of housing 22, connecting with pairs of passages such as 34, 35, only portions of which appear in this view. A face view of one impeller is shown in FIG. 4, from which it will be seen that the impeller in this case is a single piece, vanes 36 being bent from plate 37.

Referring again to FIG. 2, impellers 30, 31 are attached to discs 38, 39 in any suitable manner. Discs 38, 39 are made of magnetic material, preferably a sintered ceramic, which is selectively polarizable, for purposes later shown. The impellers and other pump parts are made of non-magnetic materials, such as brass, aluminum, or the like. Magnetic discs 38, 39 are affixed to bushings 40, 41, as by crimped tongues 42, 43, whereby the discs are prevented from shifting circumferentially or axially outward relative to the bushings. The disc-bushing assemblies are held against inward axial shifting toward housing faces 44, 45 by sleeve 46a. Bushings 40, 41 are revolvably mounted on sleeve 46b, at the ends of which are two seals 47, 48. The enclosure of the pump chamber is completed by two membranes 49, 50, which are clamped against seals 26, 27 by cap 23 and closure 24, and against sleeve 46 by nut 51 and spacer 52. On the exterior of membranes 49, 50, opposite magnet discs 38, 39, are magnet discs 53, 54, whose material and principal dimensions are the same as those of 38, 39. In fact, for economical manufacture and interchangeability, the several magnet discs may be made identical.

Discs 53, 54 are fixed to hubs 55, 56 by crimp tabs such as 57, 58, similar to the crimps 42, 43. Hubs 55, 56 are in turn fixed to shaft 59, the hubs being spaced along shaft 59 at a distance predetermined by spacer 52 and shim washers 60, 61. The disc spacing thus determined is such as to establish preselected gaps between magnet disc pairs, just slightly greater than the thickness of membranes 49, 50.

Shaft 59 is journalled in sleeve bearings 62, 63, inside spacer 52. Shaft 59 projects beyond hub 54 into auxiliary housing 24, at which end it may be coupled in any suitable manner to motor 21 (FIG. 1). Thus, the pump and its magnetic drive comprise an integral structure, which may be pre-assembled to precision standards and then coupled to a selected prime mover, without disturbing the adjustment of the pump and magnetic drive parts. Similarly, should a drive motor subsequently require repair or replacement, the motor can be removed and replaced without disturbing the magnetic drive.

The magnetic discs 38, 39, 53, 54 are so magnetized as to establish attractive forces between the closely opposed pairs. The preferred ceramic magnetic materials have the desirable characteristics of being selectively polarizable to virtually any desired flux densities, pole spacing and orientation. Therefore, the magnetization pattern may be varied to suit the torque, power and structural requirements of the driven unit. Generally, it is desirable to establish the poles at the largest feasible radius so that maximum torque can be realized from any given attractive force. An additional advantage of the preferred magnet disc materials is that high individual pole flux density and optimum pole spacing can be established in a relatively shallow member without danger of "perforation" by the internal flux forming the "horseshoe" circuit between coacting oppositely charged poles. Such "perforation" results in a partial or complete break of the inner magnetic circuit and consequent loss of magnetic effect, a phenomenon well known to those skilled in magnetics. Previous attempts to avoid this type of loss or failure have generally involved combinations of large numbers of partially saturated, deep pole pieces (foci) for a given torque, with consequent excessive cost and bulk. In this invention, the novel combination of materials and arrangement facilitates the effective use of fewer, shallower, more highly saturated pole "pieces," or foci, whereby a more compact, less costly structure can be produced for given torque requirement. Yet, the same basic structure can be varied within a wide range of torque requirements merely by varying the foci, flux density and numbers of poles according to the demand.

Proceeding now to the magnetic characteristics, reference is first made to FIG. 3, which is a face view from the left end of FIG. 2, with cap 23 removed. In the ensuing description letters N and S designate north and south magnetic poles respectively, while subscripts 1 and 2 represent driving and driven poles respectively. Broken lines looping pairs of poles with opposite sign indicate the internal circuit coupling the poles, that is, the "horseshoe." In this case, 4 pairs of poles are shown in disc 53, alternating in sign, the foci being on the face opposite to that of the view. That is, the poles face disc 38, FIG. 2, which has the same pole pattern on its opposing face, but of reverse sequence, when facing, so that N poles face S poles and vice versa, when looped poles are matched. The same magnetic pattern is impressed on discs 54, 39. Manifestly, when magnetic loops match, the pairs of discs attract each other, flux penetrating the thin, non-magnetic membranes 49, 50 with minimum loss.

When the loops match precisely the resultant flux lines are perpendicular to the disc faces, random or stray flux cancelling. In this position there will be no component parallel to the disc faces, hence there is pure axial thrust, and no torque is transmitted. If now torque is applied by the prime mover (e.g. motor 21, FIG. 1) to the driving discs 53, 54 (FIG. 2), the latter will turn alone until the driving poles are slightly displaced from the driven poles in the direction of rotation, as shown in FIG. 12, which is a fragmentary diagram. The displacement is exaggerated for purposes of illustration. With the relative pole positions as here shown, the attracting force resultants will be angular to the disc faces, having tangential components pulling the driven disc and attached member in the direction of the arrow. Actually, at start, if the driven member has a substantial inertia, the driver may make a number of rotations, giving successive slight impulses to the driven member, until the latter is "picked up" when the motor is up to running speed. This is advantageous, reducing starting torque on the motor, making it practicable to use an inexpensive motor with low starting torque characteristic, such as a split-phase motor. After a short pickup period, the coupling discs will lock magnetically in the relative positions of FIG. 12, at a displacement for which the resultant torque just balances the running load. It will be noted that if the driver tends to overrun the driven member, tending to increase pole displacement, the resultant reduction in total magnetic force will be offset in torque effect by a very rapid increase in the proportion of the total represented in the torque component. Contrariwise, any tendency for the driven member to "catch up" to the driver, reducing pole displacement, will cause a rapid reduction in the torque component portion of the total megnetic attraction, as the total tends to increase upon the poles approaching each other. This compensative effect assures maintenance of the drive relation under variable load conditions, in view of the geometric relations pertaining to a small gap between discs. It is only necessary to establish the appropriate magnetic forces and gap between the discs for the given design and load. The design shown, thus implemented, will maintain coupling up to the maximum torque of which it is capable, which is desirably the maximum safe torque on the motor or other dynamic component. If this torque is exceeded by the load torque, the coupling will slip, protecting the motor or other critical component against damage. Unless the motor is stopped by manual or other control means, the coupling will pick up and start the load when the overload is relieved. If so elected, the unit will continue in safe operation despite temporary overloads.

Since magnetic attraction drops very rapidly with slight increase in attractive pole separation, whether axially or circumferentially, it is necessary to establish close axial and circumferential spacing for the attractive poles, in the running position, so that practical flux densities may be used. In such circumstances, the torque component will be quite small relative to the axial component, and high thrust loads exist. In the design of FIG. 2, the disc pairs have matched magnetic characteristics, so that the thrust effect on the impeller assembly consists of equal forces in opposite directions, or zero net thrust. Also, as will be apparent from FIGS. 1–3, the turbine type, dual-impeller pump provides a balanced flow and consequent hydraulic balance in the axial direction, so that little or no net thrust is imposed on the impeller assembly, either hydraulically or magnetically. Therefore, no special mechanical provisions need be made for thrust friction. This feature is particularly advantageous in water or chemical pumps, as thrust bearings for such services are quite expensive, at best requiring frequent attention or replacement, due to corrosion and wear.

Should a particular load requirement be within the torque capacity of a single disc pair, the construction may be modified in such manner that one pair functions only as a thrust balance. Such a modification, involving minimum variation from the dual drive design of FIG. 2, is shown in FIG. 14. In this view, reference numerals for equivalent parts are the same as in FIG. 2, with the addition of 200. Drive magnet 254, attached to hub 256, is fixed to drive shaft 259. Driven magnet 239, attached impeller 231 and bushing 241 are coupled to bushing 240, magnet 238 and impeller 230 by means of a rigid coupling sleeve 240a, which may be threaded to bushings 240 and 241. Stop portion 240b and a compressible grommet 240c provide for fine adjustment of spacing and polar orientation of the magnets and impellers, while locking the assembly.

Magnet 253 is opposed to magnet 238. All the magnet discs are similar in structure and magnetization to those described in connection with FIG. 2, but in the form of FIG. 14, magnet disc 253 is not affixed to shaft 259. While shaft 259 is shown extending through the impeller assembly as in the case of shaft 59, FIG. 2, for purposes of interchangeability, the outboard end serves no drive function. If desired, shaft 259 may be shortened, but should be made as long as necessary to assure concentricity with spacer 252. Such foreshortening is indicated at 259a. Hub 255, holding disc 253, is revolvably supported on cap 260 which has two or more bendable tabs 260b to hold hub 255 firmly, but rotatably, against positioning face 260b. With the construction described, when power is applied to shaft 259, magnet 254 will drive both impellers 231 and 230, magnet 238 driving magnet 253 with negligible torque, but maintaining thrust to oppose that exerted between magnets 239 and 254. There will be a slight difference in pole displacement between magnets 238, 253 as compared to that between 239, 254. If precision balance is desired, the slight thrust difference between the two magnet pairs can be erased by slightly increasing the gap between magnets 238, 253, achievable by appropriate selection of spacing shims, as described in reference to FIG. 2.

*Coupling with one pair*

Figure 5:
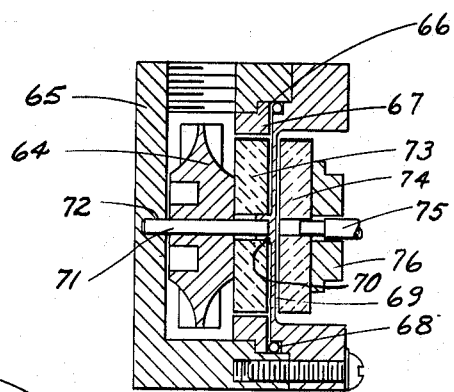
FIG. 5 is a longitudinal section through a centrifugal vane pump incorporating another adaptation of the invention.

In some applications, the dual drives of FIG. 2 or 14 may be impracticable, due to space, cost or other limitations. An embodiment of this invention with a single pair of magnet discs in face-to-face relation is illustrated in FIG. 5. The unit shown by way of illustration is a vaned, single-impeller pump of a simple, inexpensive design for light duty. Impeller 64 is housed in casing 65, with bushing 66, cap 67 and seal 68 completing the enclosure. These parts are of non-magnetic materials. Cap 67 has a thin web 69, with an internal, central boss 70 which forms the bearing for one end of impeller shaft 71, whose other end is supported in pocket 72 of casing 65. Impeller 64 is affixed to shaft by means of a setscrew, key or pin (not shown). Magnet disc 73, similar to those described with reference to FIG. 2, is attached to impeller 64, by pins, dowels, or the like (not shown). Exteriorly of web 69, magnet disc 74 is fixed to a drive shaft 75 by means of attached hub 76. Drive shaft 75 may be the take-off from any desired prime-mover, transmission or other power device.

The arrangement of magnet poles for discs 73, 74, is shown as a diagrammatic superimposition in FIG. 13. The relative positions are shown in driving relation for rotation in the direction of the arrow, circumferential displacement being somewhat exaggerated for sake of clarity. Four loops or couples are shown for each disc, designated A, B, C and D. The poles of the driving disc 74 alternate in sign, in conventional manner, but in the driven disc 73, the poles of alternate couples are in reverse sequence. Also, while couples of disc 74 (subscript 1) are equally spaced at 90°, the angle between couples A, B and C, D of disc 73 (subscript 2) are less than 90°, the alternate angles being correspondingly greater than 90°. The couple angle differential is twice the optimum driving displacement angle between contiguous poles of the two discs. Thus, with $N_1$, $S_1$ leading $S_2$, $N_2$ in couples A, there causing an attractive force with a component in the direction of rotation, $N_2$, $S_2$ trail $N_1$, $S_1$ in couples B, causing a repellant force with a component in the direction of rotation. The same relationships exist in couples C and D respectively. When the pole flux densities are equal throughout, the repellant axial thrust equals the attractive thrust, so that the net thrust on the driven member is zero. The force values involved in the usual application are well within the capacity of practically sized discs to absorb without excessive stress or deformation. Also, the bending stresses on the discs may be minimized by appropriately proportioning for size, number of poles and flux densities, as previously noted.

*Radial-pole couplings*

The face-to-face, or axial-pole, coupling arrangements previously described generally provide maximum conservation of overall size, weight, shaft and bearing loads, inertia and other elements of efficiency or economy. However, there are applications in which axial space limitations preclude achieving all the desirable features of an integrated unit with the axial-pole coupling. In such case, a radial-pole, or telescoping magnet arrangement may be desirable.

FIG. 6 illustrates an adaptation of this invention in the form of a radial-pole, or telescoping ring magnetic coupling. The coupling is shown applied to a centrifugal pump, for purposes of illustrative comparison with the previously described drives. It will be obvious that variations of structure and power requirements of the driven apparatus will necessitate some variations in the coupling position or construction. For example, the volute case of a centrifugal pump precludes telescoping the impeller proper into the coupling in any practical manner. Therefore, the coupling members are offset from the impeller, as seen in FIG. 6. On the other hand, with an axial flow pump, axial fan or other circular-cased rotary device, full telescoping of the driven member into the coupling members will often be practicable, in which case some mechanical details will differ from FIG. 6, but without departing from the essence of the inventive concept represented.

In the assembly of FIG. 6, casing 77 and liner 78 enclose vane impeller 79, which is clamped to extension hub 80. Spaced O-rings 81, 82 on the outside of hub 80 provide a grip to hold magnet ring 83 on hub 80, non-rotatable relative thereto, the exterior diameter of the O-rings being somewhat greater than the inside diameter of ring 83, creating a tight force fit. Thimble 84 is fitted freely inside hub 80, bearing on thrust washer 85. The hub 80 and magnet ring 83 are confined by a thin, non-magnetic, flanged cup 86, which bears on seals 87 and 88 to maintain the casing 77 fluid tight. Cup 86 is drawn down on the seals by means of cap-screws (not shown) bearing on flange 89 and threaded to housing 77. Seal 88 bears on the end of thimble 84 and is confined by retainer 90, which is fastened to cup 86 by rivets 91.

Magnet ring 92 is pressed into cup 93, which has a center pilot stud, journaled in cup 89 and projecting into thimble 84, with its inner end bearing on thrust washer 94, thereby positioning ring 92 concentric and axially coextensive with ring 83. Cup 93 is revolved by means of a crank mechanism consisting of pin 95 and eccentric 96, the latter being removably fixed to shaft 97 of motor 98. Obviously the motor shaft could be directly connected to a hub provided on cup 93, but not only would the overhang load be excessive for the normal motor shaft, but the positioning of cup 93 would be directly involved with the assembly and positioning of the motor. As with the assembly of FIG. 2, it is desirable to position the magnet members independently of the motor, so that motors may be installed, removed, repaired and restored without disturbing the magnet positions. The arrangement of FIG. 6 provides a close-coupled means of accomplishing the purpose, motor removal being accomplished merely by freeing eccentric 96 from shaft 97, to which it is held by a set-screw or the like (not shown). Obviously a shaft extension from cup 93 could be separately coupled to a coaxial motor shaft, but such arrangement would unduly increase the overall assembly length, partially defeating a principal objective of the radial-pole magnetic coupling.

In theory, if dissimilar poles on rings 92 and 83 were precisely opposed on radiants common to each opposed pair, there would be no axial thrust imparted to the impeller 79. In such ideal conditions, all resultant magnetic forces would be purely radial. However, such ideal conditions are not achievable in practice. The extremely high precision manufacture which would be necessary to eliminate all end play and measurable, significant variations in parts would make the overall cost excessive for all but the most exceptional applications. Therefore, in practice it will not be feasible to match poles on common radiants. If the N–S loop span on both driver and driven rings were made nominally of the same dimension, there would be random conditions of close matching, plus and minus displacement, or relative shift of the pole sets axially in or out from each other. Considering that perfect axial hydraulic balance of the impeller cannot be expected, the combination of random hydraulic and magnetic thrusts will usually result in axial hunting of the assembly and thrust buildups, which can be guarded against only with expensive precision fitting and thrust bearings. To avoid such expensive construction, the pole spans of the magnetic loops in one of the magnet rings of the construction in FIG. 6 are slightly different from those of the other ring. For example, as shown, $N_1$–$S_1$ spans are slightly greater than the $S_2$–$N_2$ spans. The difference in spans is slightly more than the probable cumulative axial variation in ring positions. With the average fits and tolerances maintainable at moderate cost, the span difference is not so great as to significantly decrease the torque components, but in any case a slightly higher flux density may be used to offset any loss due to axial pole displacement. With the poles arranged as shown, the axial thrust components of the attractive forces between $N_1$ and $S_2$ poles will be substantially equal and opposite to the thrusts produced between $S_1$ and $S_2$ poles. As explained in previous description relating to short-gap magnetic forces, variations in attractive force accompanying variations in gross gap, due to shifting displacement, are offset by a compensating change in the component parallel to the direction of shift, so long as the displacement is within a restricted range and greater than zero. Assume that ring 83 were shifted slightly to the left, bringing $S_2$ closer to $N_1$, but not on the same radiant, while $N_2$ is displaced further from $S_1$. Then attractive force developed at $N_1$–$S_2$ would increase slightly, and that at $S_1$–$N_2$ decrease slightly. But the proportion of thrust components would change inversely, with proportionately less thrust developed from the higher total force at $N_1$–$S_2$ and proportionately higher thrust developed from the lower total force at $S_1$–$N_2$, thus maintaining substantially balanced thrust. Consequently, substantially balanced thrust is maintained within the narrow range of displacement variation prevailing, there is no tendency for the coupling to oscillate or hunt axially, and substantially no thrust is imposed on impeller 79 by magnetic forces.

Figure 8:
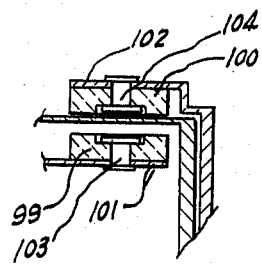
Figure 9:
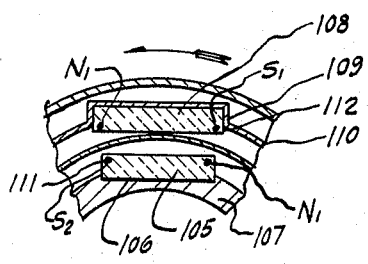

The magnets 83 and 92 as shown in FIG. 6 may be cast rings. However, in high torque applications, requiring a large number of poles at a relatively large radius, rings may be uneconomical in material and manufacturing cost. In such case, it is preferable to use wafers, as illustrated in FIGS. 8–11. These wafers are easy to manufacture and mount, require only so much magnetic material as the desired magnetic characteristic demand, and can be readily arranged for best structural conditions. In FIG. 8, magnet wafers 99, 100 are attached to non-magnetic carriers 101, 102 by means of non-magnetic rivets 103, 104 respectively. Alternatively, the carrier rings may be provided with lands or pockets to receive the wafers, which may be cemented in place, as shown in FIG. 9. In this form, inner magnet wafer 105 is cemented to a land or flat 106, formed on the outside of the inner carrier 107. Outer wafer 108 is retained in pocket 109, formed in outer carrier 110. The carriers in other respects may be similar to corresponding parts 80, 93 in FIG. 6, it being understood that the number of wafers used will be determined according to the number of poles desired around the circumference.

Figure 11:
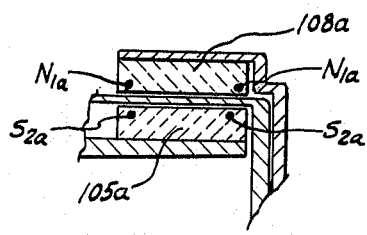
Figure 10:
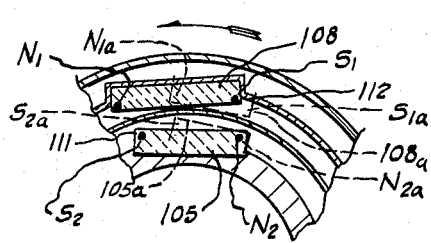

An additional advantage of the wafer construction is illustrated in FIGS. 9–11. If magnet rings are used, development of optimum magnetic torque component demands that there be as little clearance between the rings as possible, since the displacement of attractive poles circumferentially increases the distance between foci, with a corresponding decrease in total attractive force. Furthermore a relatively high magnetic saturation and high resultant attractive force are required to produce adequate torque component, this component being small in proportion to the resultant under the geometric conditions imposed. On the other hand, the geometric conditions with wafer magnets disposed as in FIGS. 9–11 are favorable to development of high torque component by taking advantage of edge effects at 111 and 112. FIG. 9 shows magnets 105 and 108 in their stationary close-coupled position, the attractive foci, represented diagrammatically by the points $N_1$, $S_2$, and $S_1$, $N_2$, being radially disposed. In this position there is no magnetic torque component. Upon rotation of driving magnet 108 to displace it angularly in the direction of the arrow, the position represented in FIG. 10 will be reached, whereat the effective magnetic gap determined between $N_1$ and edge 111, and between edge 112 and $N_2$ will be substantially no greater than the normal radial gap. Therefore, the magnetic force resultant in the position of FIG. 10 will be substantially the same as the radial resultant in the position of FIG. 9, but with a substantial tangential or torque component. This arrangement consequently tolerates a relatively greater angular displacement between the attractive poles, whereby to produce a higher ratio of torque component to resultant magnetic force of given intensity at a predetermined magnetic gap.

The wafer magnet construction affords a high degree of selectivity of magnet size, polarization and gap to suit various torque requirements. This facility is illustrated by the broken lines of FIG. 10, which represents magnet pieces 105a and 108a, somewhat narrower, and with closer pole coupling, than their counterparts 105 and 108 in solid lines. The reduced effective gap between attractive poles is illustrated in the section view, FIG. 11. The resultant attractive force for given flux density will be somewhat higher than between $N_1$, $S_2$, but the optimum angular displacement and corresponding proportionate torque component will be somewhat less with $N_{1a}$, $S_{2a}$ than with $N_1$, $S_2$. It will readily be seen from this example of variability that various combinations of wafer sizes, flux densities, gap, displacement and torque characteristic may be effected with the arrangement of FIGS. 9–11, it being understood that the number of magnet pairs around the circumference of the coupling may also be varied to achieve the desired total torque for a given application.

Although several embodiments of the invention have been illustrated and described, by way of example, still other variants in design and arrangement may be made without departing from the spirit and scope of the invention as defined in the claims, which are as follows.

We claim:

1. A magnetic drive coupling of the permanent magnet type, comprising: at least one driving member having a plurality of magnetic first poles rotatable about an axis at a distance therefrom; at least one driven member having a plurality of magnetic second poles mechanically separated from said first poles, said second poles being rotatable about said axis at a distance therefrom; at least some of said first poles being juxtaposed to some of said second poles when in predetermined angular relation, thereby to establish rotary magnetic driving forces between said first and second juxtaposed poles, some of said forces having total axial force components of given magnitude in one direction, other of said forces having total axial force components of substantially the given magnitude in the opposite direction.

2. A magnetic drive coupling according to claim 1, wherein at least some of said first poles are disposed in a first disc, and at least some of said second poles are disposed in a second disc in oppoesd face relation to said first disc.

3. A magnetic drive coupling according to claim 1, wherein said first poles are disposed in a first disc member, said second poles are disposed in a second disc member opposed to said first disc member, the sequence and spacing of poles being such that when some of said first poles attract second poles with force components tending to rotate said first and second disc members together in a given direction, other of said first poles repel second poles with force components in said direction of rotation, the axial force components of the attracting poles being opposed by the axial force components of the repelling poles.

4. A magnetic drive coupling according to claim 1, wherein some of said poles are disposed in a first drive member, and other of said first poles are disposed in a second drive member axially spaced from said first drive member, said second drive member being connected to said first drive member for rotation therewith; some of said second poles are disposed in a first driven member, and other of said second poles are disposed in a second driven member axially spaced from said first driven member; said first driven member is axially opposed to said first drive member in given hand relation; and said second driven member is axially opposed to said second drive member in relation opposite to said given hand.

5. A magnetic drive coupling according to claim 1, wherein said first poles are cylindrically disposed, some of said first poles being axially spaced from other of said first poles; said second poles are cylindrically disposed interiorly of said first poles, some of said second poles being axially spaced from other of said second poles; the axial distance between said spaced first poles being different from the axial distance between said spaced second poles; and the axial displacement between juxtaposed poles at one hand being substantially equal to the axial displacement between juxtaposed poles at the other hand, in the opposite direction.

6. In a rotary drive, the combination of; a rotatable first member carrying an annular series of first magnets; a rotatable second member carrying an annular series of second magnets axially opposed to said first magnets; some of said first magnets being in attractive driving juxtaposition to some of said second magnets when said first member is in predetermined angular relation to said second member; other of said first magnets being in repelling driving juxtaposition to other of said second magnets when said members are in said angular relation; whereby axial thrust components of attractive magnetic forces are opposed by axial thrust components of repelling magnetic forces.

7. In a rotary drive, the combination according to claim 6, wherein said members comprise discs of permanently magnetizable material, selectively polarized to establish said series of magnets.

8. In a rotary drive, the combination according to claim 6, wherein said members comprise discs of permanently magnetizable material; said first member is selectively polarized to establish equi-angularly spaced first magnets with internally coupled poles in consistent hand of angular relation; and said second member is selectively polarized to establish non-equi-angularly spaced second magnets with internally coupled poles in alternating hand of angular relation, the differential angle of spacing for said second magnets being substantially twice the optimum angular displacement of said first magnets relative to said second magnets when juxtaposed in driving relation.

9. In a rotary drive coupling, the combination of; a shaft; axially spaced first discs affixed to said shaft; a bushing assembly concentrically surrounding said shaft between said first discs, said shaft being rotatable relative to said assembly; axially spaced second discs affixed to rotatable members of said bushing assembly, each of said second discs opposing one of said first discs; all of said discs being of magnetic material, selectively polarized with poles of said first discs juxtaposable to poles of said second discs at a predetermined relative angle of rotation; whereby, upon rotating said shaft, the juxtaposition of poles at said relative angle establishes attracting magnetic forces between said opposed discs to cause said assembly to rotate with said shaft.

10. In a rotary drive coupling, the combination according to claim 9, wherein said magnetic forces are established by juxtaposition of poles radially spaced from the axis of rotation, with poles of said first discs angularly displaced relative to poles of said second discs, said forces having tangential and axial components, the axial components in one direction being substantially equally opposed by axial components in the other direction.

11. In a rotary drive coupling, the combination according to claim 9, including adjustable spacing means for establishing and maintaining predetermined gaps between opposed first and second discs.

12. In a rotary drive coupling, the combination according to claim 9, including spacing means for adjustably positioning said first discs axially of said opposed second discs; and bearings in said spacing means journalling said shaft.

13. In a rotary drive coupling, the combination according to claim 9, wherein said first discs are axially outward of said second discs; spacing means internally of said bushing assembly, substantially coextensive therewith; a housing surrounding said second discs and said assembly; a sleeve substantialy coextensive with said assembly, between said second discs and said spacing means; annular membranes separating each of said first discs from its opposed second disc, said membranes extending radially from the ends of said sleeve to portions of said housing beyond the peripheries of said second discs; seals between said membranes and the ends of said sleeve, and between said membranes and said housing; and means for pressing said membranes against said seals.

14. A rotary drive coupling, comprising: a shaft; an adjustable spacer assembly journalling a portion of said shaft; a magnet member affixed to said shaft adjacent one end of said spacer assembly; a second magnet member mounted at the other end of said spacer assembly for rotation relative to said spacer assembly and said shaft; a bushing assembly surrounding a portion of said spacer assembly between said first and second magnet members, a portion of said bushing assembly being rotatable relative to said spacer assembly and said shaft; a third magnet member affixed to one end of said rotatable bushing assembly portion in position to oppose said first magnet member; a fourth magnet member affixed to the other end of said rotatable bushing assembly portion in position to oppose said second magnet member; means adjustably connecting said third and fourth magnet members for rotation together with said rotatable bushing assembly portion; all said magnet members being so polarized that poles of opposed magnets are juxtaposable at a predetermined relative angle of rotation; whereby, upon rotation of said shaft, poles of said first and third magnet members are juxtaposed to drive said rotatable bushing assembly portion with said fourth magnet member into pole juxtaposition with said second magnet member, causing all said magnet members to rotate with said shaft, the axial magnetic thrust between said first and third magnet members being opposed by the axial magnet thrust between said second and fourth magnet members.

15. A rotary magnetic drive assembly, including in combination: a drive member; a driven member; a shaft connected to said drive member; a first ring magnet affixed to said shaft; a second ring magnet affixed to said driven member, said second ring magnet closely telescoping within said first ring magnet, substantially coextensive therewith; magnetic poles on each of said first and second ring magnets, some of said poles on each of said magnets being axially spaced from others of said poles; the axial distance between poles of said first magnet being different from the axial distance between poles of said second magnet.

16. A rotary magnetic drive assembly according to claim 15, wherein poles of said first magnet are juxtaposed to poles of said second magnet at a predetermined relative angle of rotation, with juxtaposed poles axially displaced at predetermined distance, some of said poles being displaced said distance in one direction, others of said poles being displaced substantially the same said distance in the opposite direction.

17. A rotary magnetic drive assembly according to claim 15, wherein a first cup is affixed to said drive shaft; said first magnet is affixed to said first cup, internally thereof; and a second cup is affixed to said driven member, telescoping over said shaft and within said first cup, said second magnet being affixed to the periphery of said second cup.

18. A rotary magnetic drive assembly according to claim 15, including a first magnet carrier affixed to said shaft, said first magnet being affixed internally of said first carrier; a second magnet carrier affixed to said driven member, said second magnet being affixed exteriorly of said second carrier; a housing for said driven member; and a closure associated with said housing for confining said driven member, said second carrier and said second magnet, said closure having a non-magnetic membrane separating said first and second magnets.

19. In a rotary magnetic coupling: a generally circular, rotatable, first magnet carrier; a first rectangular wafer magnet affixed within said first carrier; a generally circular, rotatable, second magnet carrier telescoping within said first carrier; a second rectangular wafer magnet affixed to the periphery of said second carrier; and magnetic poles defined in each of said magnets, pole faces of said first magnet being juxtaposed to pole faces of said second magnet, each of said magnets having its said pole faces in a plane perpendicular to a radius of its said carrier.

20. In a rotary magnetic coupling, the combination according to claim 19, wherein poles of said first magnet are axially displaced a predetermined distance from juxtaposed poles of said magnet; some of said juxtaposed poles being displaced said distance in one direction, others of said juxtaposed poles being displaced substantially said distance in the opposite direction.

References Cited by the Examiner
UNITED STATES PATENTS

| | | | |
|---|---|---|---|
| 2,507,599 | 5/1950 | Johnson | 310—103 X |
| 2,688,874 | 9/1954 | Batchelder | 310—104 X |
| 3,107,310 | 10/1963 | Carriere | 310—103 |

OTHER REFERENCES

S37,679 VIIb, February 1956, German application (Kulmer).

ORIS L. RADER, *Primary Examiner.*

DAVID X. SLINEY, *Examiner.*